US006449584B1

(12) United States Patent
Bertrand et al.

(10) Patent No.: US 6,449,584 B1
(45) Date of Patent: Sep. 10, 2002

(54) MEASUREMENT SIGNAL PROCESSING METHOD

(75) Inventors: Michel J. Bertrand, Verdun; Dimo Zidarov, Brossard, both of (CA)

(73) Assignee: Université de Montréal, Montreal (CA)

( * ) Notice: Subject to any disclaimer, the term of this patent is extended or adjusted under 35 U.S.C. 154(b) by 0 days.

(21) Appl. No.: 09/435,816

(22) Filed: Nov. 8, 1999

(51) Int. Cl.$^7$ .............................................. G06F 15/00
(52) U.S. Cl. ...................... 702/180; 702/189; 702/191; 702/195
(58) Field of Search ................................ 702/179, 180, 702/189, 191, 193, 194, 195, 23, 24, 25, 30, 66, 69, 70, 190; 73/23.35; 250/281; 382/168; 358/522

(56) References Cited

U.S. PATENT DOCUMENTS

| | | | |
|---|---|---|---|
| 4,314,343 A | | 2/1982 | Tomlinson |
| 4,524,420 A | | 6/1985 | Glodo et al. |
| 4,546,643 A | | 10/1985 | Bonneyrat et al. |
| 4,802,102 A | | 1/1989 | Lacey |
| 4,837,726 A | | 6/1989 | Hunkapiller |
| 5,092,343 A | * | 3/1992 | Spitzer et al. .............. 128/733 |
| 5,291,426 A | | 3/1994 | Collins et al. |
| 5,592,402 A | * | 1/1997 | Beebe et al. .................. 702/32 |
| 5,633,511 A | * | 5/1997 | Lee et al. .................... 250/587 |
| 5,737,445 A | | 4/1998 | Oppenlander et al. |
| 6,047,134 A | * | 4/2000 | Sekine et al. ................. 396/55 |
| 6,112,161 A | * | 8/2000 | Dryden et al. ................ 702/85 |
| 6,147,344 A | * | 11/2000 | Annis et al. ................. 250/281 |
| 6,178,387 B1 | * | 1/2001 | Wang .......................... 702/66 |
| 6,266,633 B1 | * | 7/2001 | Higgins et al. ............. 704/224 |

FOREIGN PATENT DOCUMENTS

JP    01 160176    6/1989

OTHER PUBLICATIONS

Cairns et al In Mass. Spectrom. Rev. 8, (1989) pp. 93–117, "Evolving Critera for Confirmation of Trace Level Residues in Food and Drugs by Mass Spectrometry".

Tomer et al in J. Chromatogr. 492, (1989) pp. 189–221, "Biochemical Applications of Liquid Chromatrography–Mass Spectrometry".

(List continued on next page.)

*Primary Examiner*—Marc S. Hoff
*Assistant Examiner*—Paul Kim
(74) *Attorney, Agent, or Firm*—Ogilvy Renault; James Anglehart

(57) ABSTRACT

A method of processing data representing intensity values of a measurement signal as a function of a discrete variable such as time, which signal being characterized by series of peaks mixed with a substantially regular background noise, provides efficient noise attenuation and peak detection capabilities. When applied to a two-dimensional system, the method comprises an initial step of forming an intensity histogram vector representing a frequency distribution from the intensity values, which intensity histogram vector having N frequency vector components associated with corresponding N intensity sub-ranges within a maximum range extending from a minimum intensity value to a maximum intensity value. This initial step is followed by a step of zeroing a portion of the data corresponding to the intensity values which are below an intensity threshold value derived from shape characteristics of the distribution. Then, the intensity threshold value is subtracted from each remaining portion of the data to obtain processed data representing the measurement signal in which each peak exhibits an enhanced signal-to-noise ratio. The method is also applicable to multi-dimensional measurement systems involving more than one variable, such as chromatography/mass spectrometry measurement techniques.

23 Claims, 12 Drawing Sheets

OTHER PUBLICATIONS

Niessen et al in Liquid Chromatrography–Mass Spectrometry, ed. by J. Cazes, Marcel Dekker Inc., New York, (1992), pp. 399–446, "Selected Applications of LC–MS".

Lee et al in Anal. Chem. 63, (1991), pp. 357–360, "Noise Reduction of Gas Chromatography/Mass Spectrometry Data Using Principal Component Analysis".

Burton et al in Spectrochimica Acta, vol. 47B, 14, (1992), pp. E1621–E1627, "MS Interview: An Elemental Mass Spectrometry Spectral Interference Data Base".

Hau et al in Spectrochimica Acta, vol. 48B, 8, (1993), pp. E1047–E1051, "MSGRAPH: A Program for the Display of LC/MS Data".

Geladi et al in Analytica Chimica Acta, 185, (1986), pp. 1–17, "Partial Least–Squares Regression: A Tutorial".

Laeven et al in Analytica Chimica Acta, 176, (1985), pp. 77–104, "Optical Peak Area Determination in the Presence of Noise".

Duursma et al in Analytica Chimica Acta, 133, (1981), pp. 67–84, "User–Oriented Software for Determination of the Precision of Signal–Integrating Analytical Methods".

Malinowski et al in Anal. Chem., 49, (1977), pp. 606–612, "Theory of Error in Factor Analysis".

Enke et al, in Anal. Chem. 48, (1976), pp. 705A–712A, "Signal–to–Noise Ratio Enhancement by Least–Squares Polynomial Smoothing".

Lam et al in Anal. Chem., 54, (1982), pp. 1927–1931, "Cross–Correaltion, Signal/Noise Enhancement with Applications to Quantitative Gas Chromatography/Fourier Transform Infrared Spectrometry".

Biller et al in Analytical Letters, 7, (1974), pp. 515–529, "Reconstructed Mass Spectra, A Novel Approach for the Utilization of Gas Chromatograph—Mass Spectrometer Data".

Kay et al in Proceedings of the IEEE, vol. 69, pp. 1380–1419, Sprectrum Analysis—A Modern Perspective.

Ferrige et al in Rapid Commun. in Mass Spectrum., 5 (1991) pp. 374–379, "Maximum Entropy Deconvolution in Electrospray Mass Spectrometry".

Ferrige et al in Rapid Commun. in Mass Spectrom., 6 (1992), pp. 707–711, "Disentangling Electrospray Spectra With Maximum Entropy".

Ferrige et al in Rapid Commun. in Mass Spectrom., 5 (1992), pp. 765–770, "The Application of 'MaxEnt' to High Resolution Mass Spectrometry".

Childers in Modern Spectrum Analysis, D.G. Editor, New York, IEEE Press, 1978.

\* cited by examiner

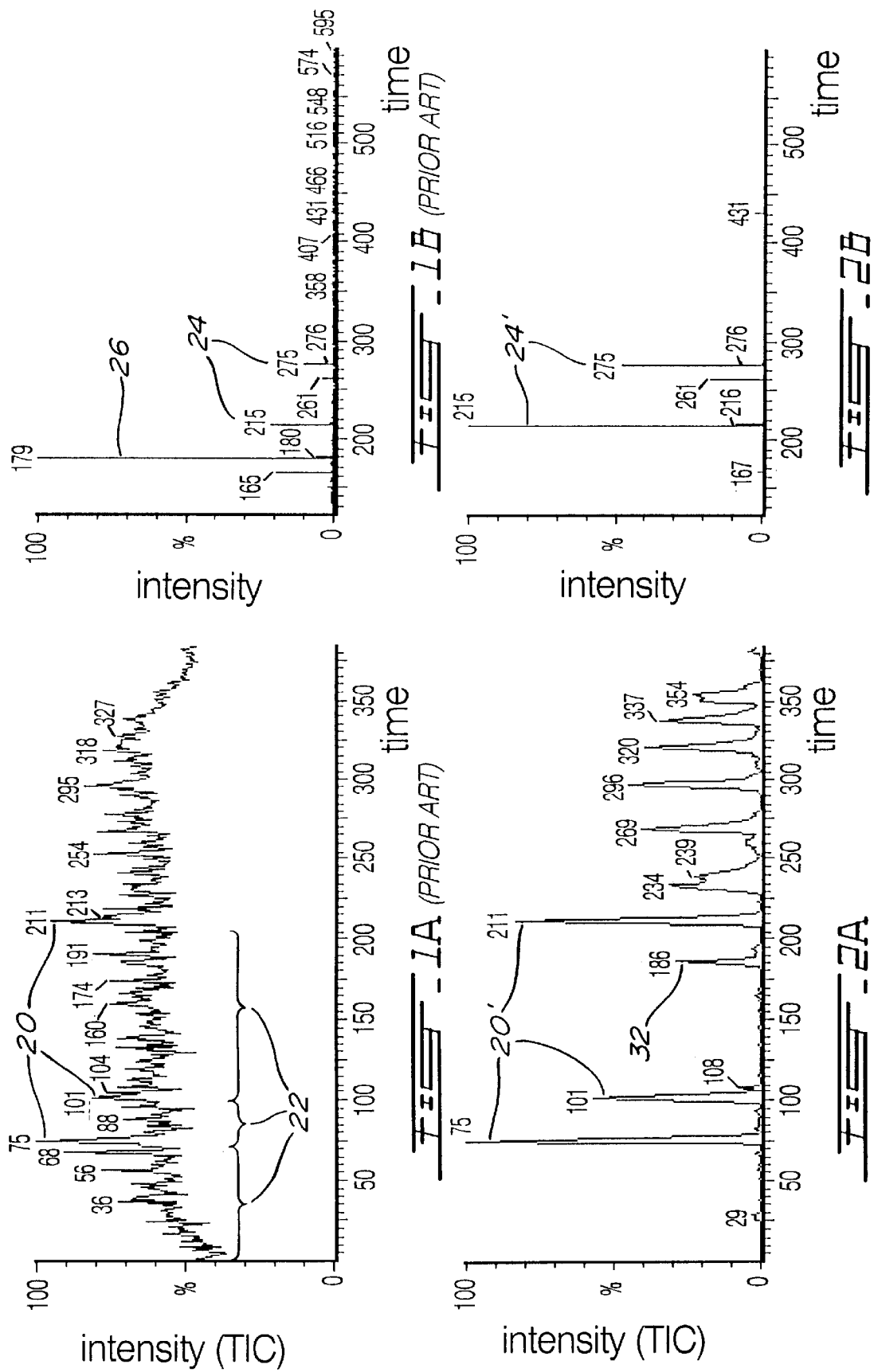

Intensity Box Number

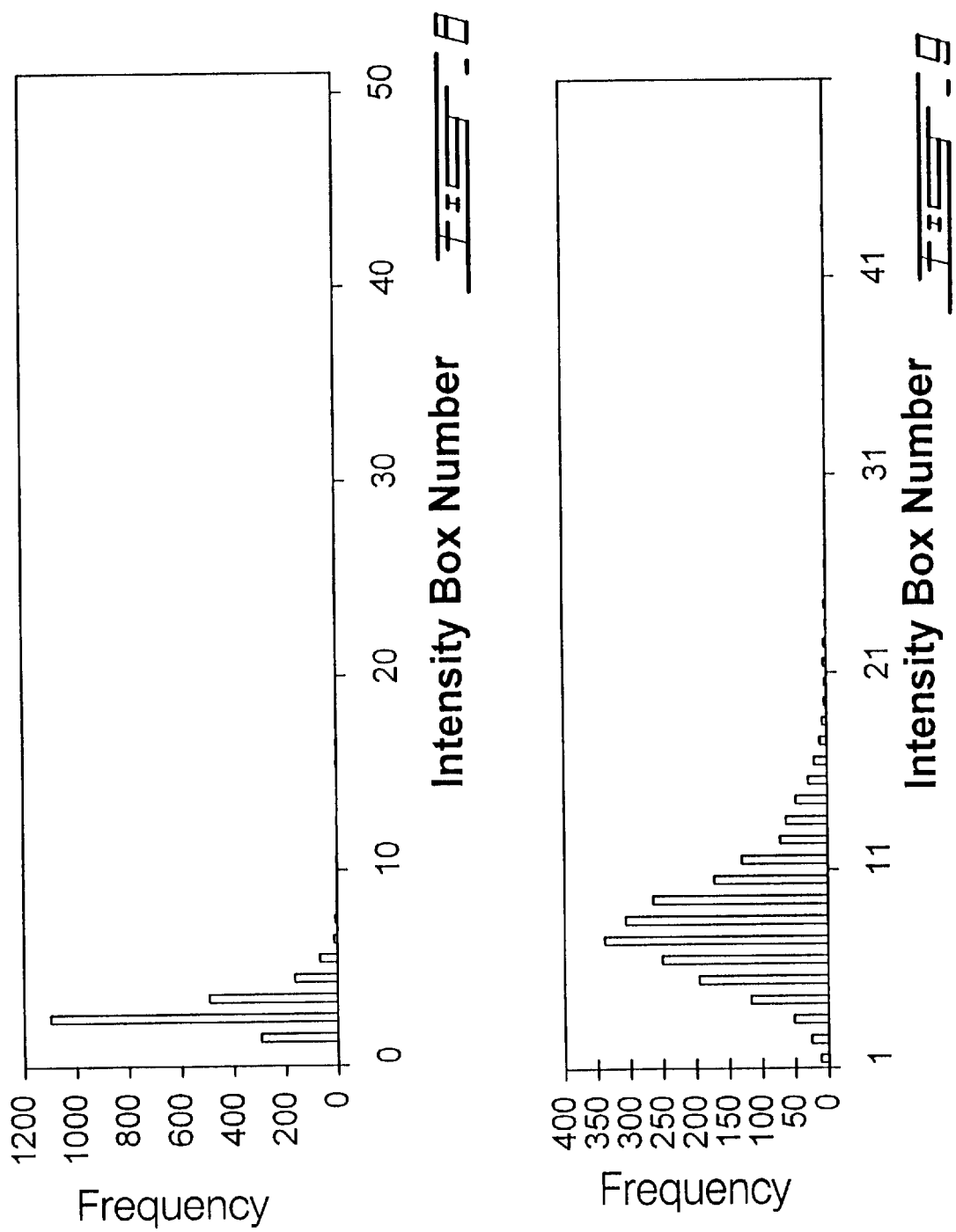

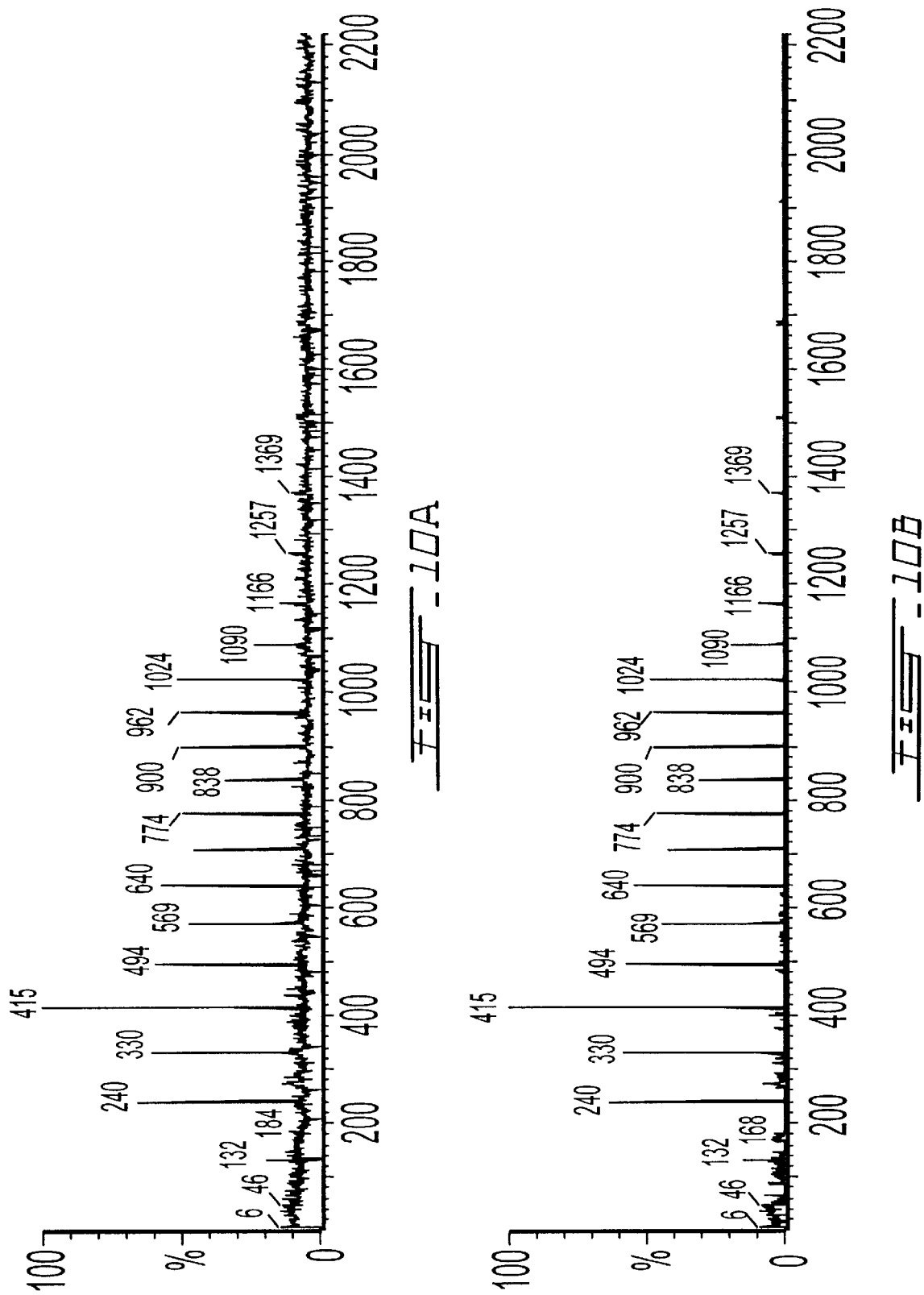

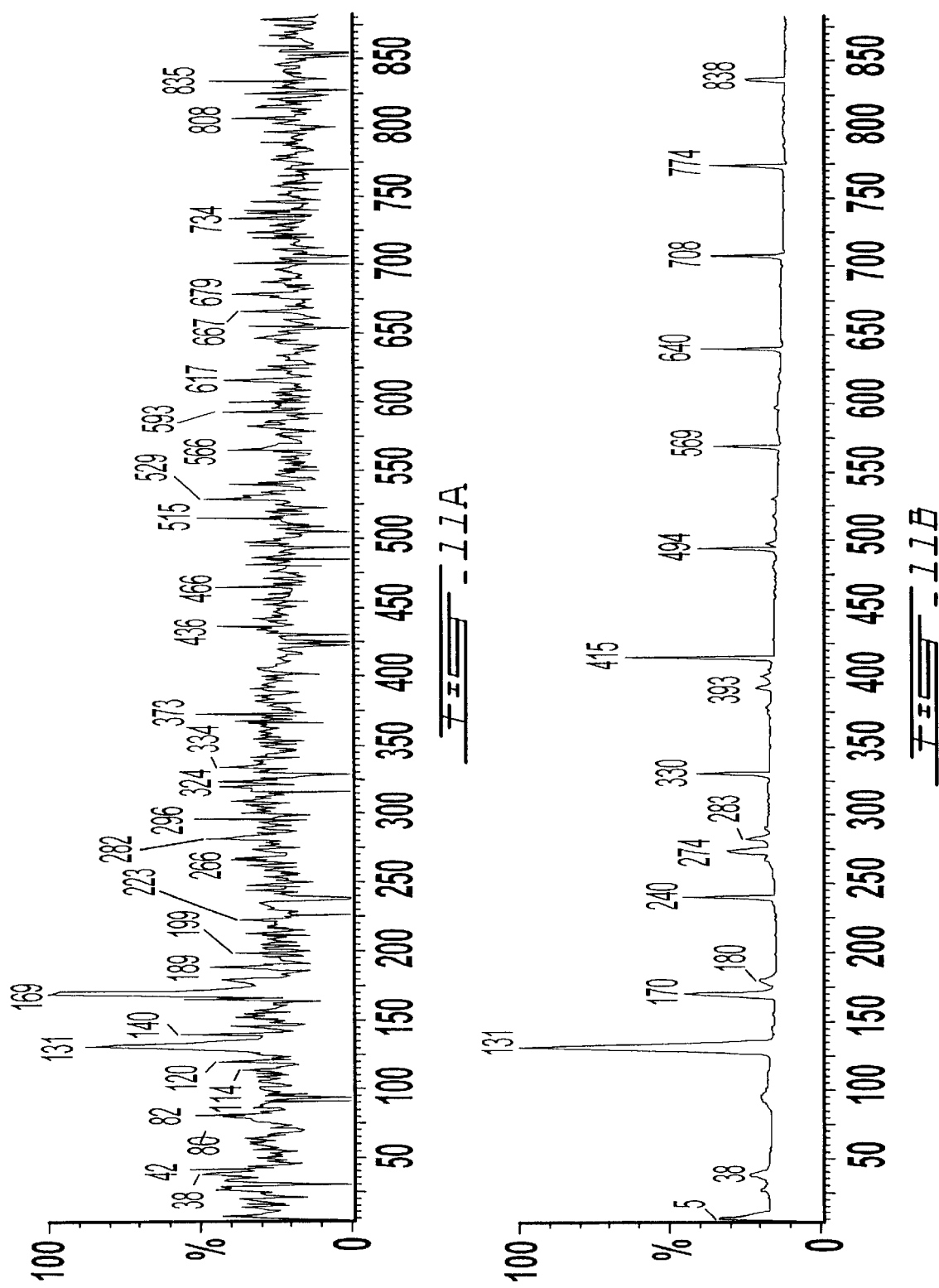

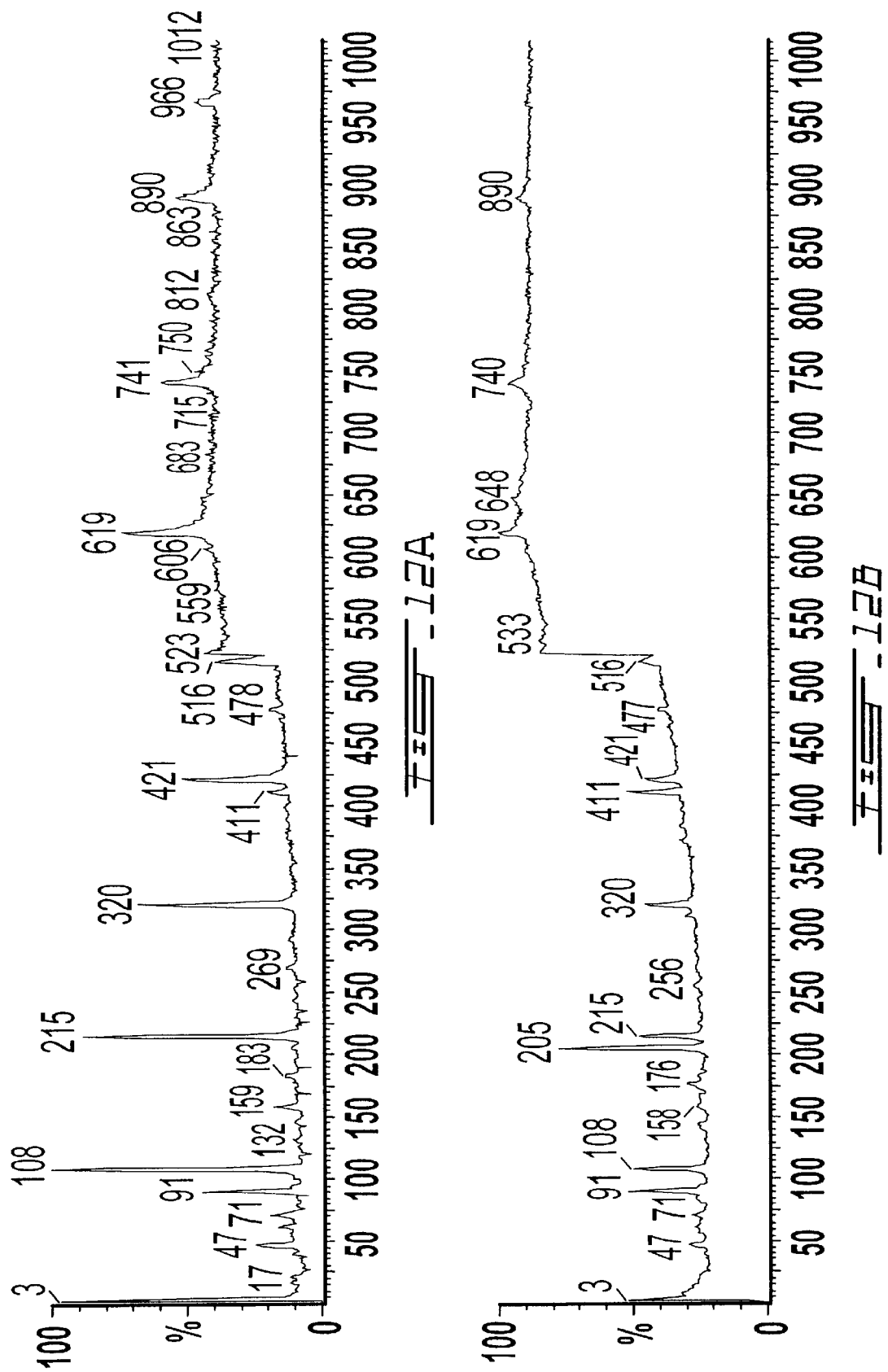

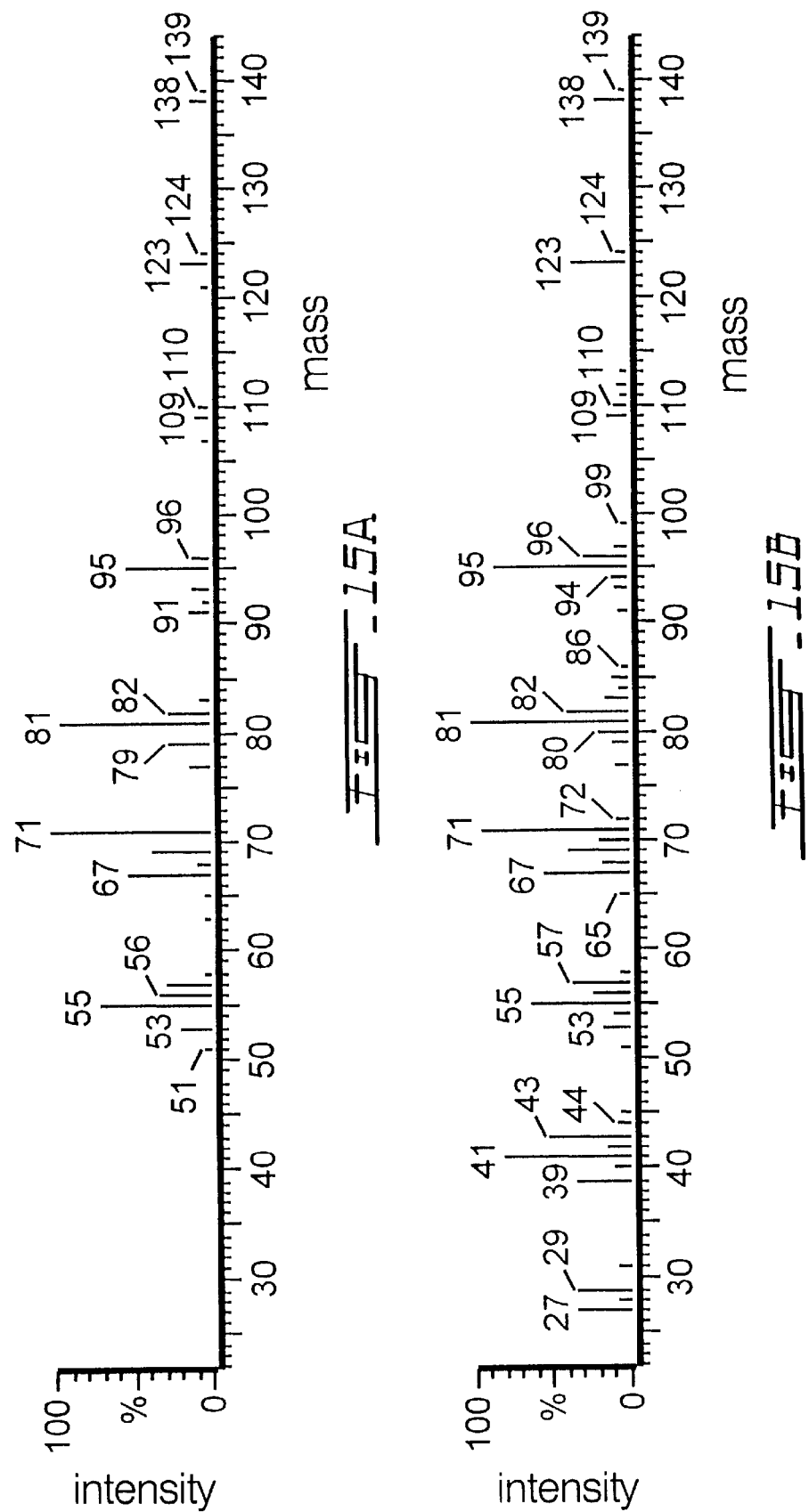

time
(scans)

scan 1  scan 2  scan 3  scan 4  scan 5   scan k   scan K

MEASUREMENT SIGNAL PROCESSING METHOD

FIELD OF THE INVENTION

The present invention relates to the field of signal processing, and more particularly to methods of processing measurement signals characterized by peaks mixed with background noise.

In recent decades, techniques for chemical analysis have substantially improved because of developments in electronics and computer sciences. Several techniques can nowadays detect and quantify extremely small amounts of materials with surprising selectivity and specificity. For example, mass spectrometry is capable of detecting a single ion (atom or molecule). Thus, the analytical instrument is no longer the limiting factor in chemical analysis. The limiting factor has become the ability to extract the signal of interest from the interfering signal that can be due to the presence of other substances, electrical noise, spikes or other sources of noise involved in the analytical procedure. Although primary analytical techniques usually provide a two dimensional graph of signal intensity as a function of some variable (wavelength, mass, distance, time etc.), many hyphenated techniques have been introduced in recent years that can provide multidimensional data matrix. This is the case for techniques such as gas chromatography-mass spectrometry (GC/MS), liquid chromatography-mass spectrometry (LC/MS), pyrolysis-mass spectrometry (Py-MS) and other techniques where a separation technique or other is coupled to a spectroscopic technique. When using these instruments, a multidimensional data matrix (intensity-variable$_1$-variable$_2$) is obtained from which the signal of interest must be extracted.

Background signal has become an important factor in the interpretation of analytical data as instrument sensitivity is constantly increased, as discussed by Cairns et al. in *Mass. Spectrom. Rev.*, 8, (1989), p. 93., by Tomer et al. in *J.Chromatogr.*, 492, (1989), p.189., and by Niessen et al. in "*Liquid Chromatography-Mass Spectrometry*", ed. by J.Cazes, Marcel Dekker Inc., New York, (1992), p.399. In hyphenated techniques such as LC/MS, GC/MS and Py-MS, background signal can mask the signals of interest. In GC/MS, the phenomenon is mainly due to the ionization of the chromatographic stationary phase. In LC/MS, since the mobile phase is overwhelmingly more concentrated than the analytes, it can create a background signal that will mask the elution peaks of interest and contaminate the mass spectra which makes interpretation very difficult. In Py-MS, a significant background signal is generated during pyrolysis that dilutes the information content of the mass spectra obtained during analysis.

FIG. 1A shows a typical LC/MS chromatogram obtained for a pharmaceutical mixture using a prior art method, in the form of the total ion current (TIC) intensity in percentage as a function of time as a first variable. FIG. 1B shows the single ion current (SIC) chromatogram obtained with the same mixture at a specific value for the mass as a second variable (mass=101). The TIC chromatogram is obtained by compressing the mass axis, intensities of all the mass peaks being added and projected on the intensity axis, as well known in the art. Each of the elution peaks 20 present in the chromatogram of FIG. 1A has a third dimension which is the mass spectrum. It can be seen from FIG. 1A that it is clearly difficult to determine the position of the elution peaks from the raw TIC chromatogram data, because of the variation and intensity of the background noise signal, a portion of which being generally designated at 22. Because the background signal is high, it is difficult to determine the true elution peaks corresponding to the compounds present in the mixture. In a similar way, it can be seen from FIG. 1B that the raw mass spectrum peak data 24 are so contaminated by background noise such as the spike appearing at time 179 and designated at 26, that it becomes very difficult to attempt identification of the compounds being present.

The need for algorithms that can remove background signal from analytical data in these techniques has been recognized for several years and many approaches have been suggested for GC/MS, ICP/MS AND LC/MS, by Lee et al. in *Anal. Chem.*, 63, (1991), p.357., by Burton et al. in *Spectrochimica Acta*, Vol. 47B, 14, (1992), p. E1621 and by Hau et al. in *Spectrochimica Acta*, Vol, 48B, 8, (1993), p. E1047. Although some of these approaches have merit under given experimental conditions, they are generally not satisfactory for a broad scope of applications involving various experimental conditions. One of the simplest prior art approach that has been suggested and used over the years consists in subtracting the spectrum or an average of the spectra that come just before or after the elution peak from that contained under the elution peak. This approach can be efficient if the spectrum before the elution peak is representative of the background and if it is of substantially lower intensity. The elution peak has to be more intense than the background for this technique to be used. In many cases, this is not the case and erroneous results can be obtained because of over or under estimation of the background signal to be subtracted. Other approaches relying on smoothing techniques have been suggested to detect elution peaks, such by Geladi et al. in *Analytica Chimica Acta*, 185. (1986), p.1., by Laeven et al. in *Analytica Chimica Acta*, 176, (1985), p.77., by Doursma et al. in *Analytica Chimica Acta*, 133, (1981), p.67., by Malinowski et al. in *Anal. Chem.*, 49, (1977), p.606., by Enke et al. in *Anal. Chem.*, 48, (1976), p.705A., and by Lam et al in *Anal. Chem.*, 54, (1982), p.1927. However, even if these approaches allow the determination of the elution peak, they do not remove interfering signal in the mass spectra which can lead to problems. Smoothing techniques treat the signal in the intensity-time plane but not in the mass-intensity plane An other example of smoothing approach in disclosed in U.S. Pat. No. 4,837,726 issued on Jun. 6, 1989 to Hunkapiller. Another approach as suggested by Biller et al. in *Analytical Letters*, 7, (1974), p.515., is based on the optimization of ion signals with time. However, this approach is only useful when the background signal is small relative to the analyte signal and it fails to recognize instrumental spikes from real elution peaks because spikes also create signal optimization with time. Lately, the technique of maximum entropy has been described in "*Modern Spectrum Analysis*", Childers, D. G. Editor, New York, IEEE Press, 1978, and by Kay at al in *Proceedings of the IEEE*, Vol. 69, pp 1380–1419, 1981, by Ferrige et al. in *Rapid Commun. in Mass Spectrom.*, 5 (1991) 370, by Ferrige et al. in *Rapid Commun. in Mass Spectrom.*, 6 (1992) 707 and by Ferrige et al. in *Rapid Commun. in Mass Spectrom.*, 5 (1992) 765. However, this technique is lengthy and does not produce mass spectra that are stripped of the interfering ions. Even though many other prior art processing methods have been proposed, such as those described in the followings U.S. Pat. Nos. 4,314,343, 4,524,420, 4,546,643, 4,802,102, 5,291,426, 5,737,445 and 5,592,402, there is still a need for simpler methods of processing measurement signals which are effective to attenuate background noise, allowing peak detection in a broad scope of applications involving various experimental conditions.

SUMMARY OF THE INVENTION

It is therefore a object of the present invention to provide methods of processing measurement signals characterized by at least one peak mixed with a substantially regular background noise, which facilitate peak detection and interpretation of data obtained with measurement techniques such as those used in analytical experiments.

According to above object, from a broad aspect of the present invention, there is provided a method of processing data representing intensity values of a measurement signal as a function of a discrete variable, the signal being characterized by at least one peak mixed with a substantially regular background noise, the intensity values being comprised within a main intensity range. The method comprises the steps of: i) forming an intensity histogram vector representing a frequency distribution from the intensity values, the intensity histogram vector having N frequency vector components associated with corresponding N intensity sub-ranges; ii) zeroing a portion of the data corresponding to the intensity values which are below an intensity threshold value $I_c$ derived from shape characteristics of the distribution; and iii) subtracting the determined intensity threshold value from each remaining portion of the data to obtain processed data representing the measurement signal with the peak exhibiting an enhanced signal-to-noise ratio.

From a further broad aspect of the present invention, there is provided a method of processing data representing intensity values of a measurement signal as a function of a first and a second discrete variable, the signal being characterized by at least one peak mixed with a substantially regular background noise, the intensity values as a function of the first discrete variable and associated with each one of M successive values for the second discrete variable being comprised within a corresponding main intensity range. The method comprises the steps of: i) forming M intensity histogram vectors $F_j$ representing frequency distributions from the intensity values associated with the M successive values of the second discrete variable, each intensity histogram vector having $N_j$ frequency vector components associated with corresponding $N_j$ intensity sub-ranges, with j=1, ..., M; ii) zeroing portion of the data corresponding to the intensity values associated with each distribution which are below an intensity threshold value $I_{cj}$ derived from shape characteristics of each distribution; and iii) subtracting the intensity threshold value from each remaining portion of the data corresponding to the intensity values associated with each distribution, to obtain processed data representing the measurement signal with the peak exhibiting an enhanced signal-to-noise ratio.

BRIEF DESCRIPTION OF THE DRAWINGS

A preferred embodiment of the processing method according to the present invention will now be described in detail in view of the accompanying drawings in which:

FIG. 1A is a graph representing a typical LC/MS TIC chromatogram obtained for a pharmaceutical mixture using a prior art method.

FIG. 1B is a graph representing a SIC chromatogram as obtained with the same mixture referred to in FIG. 1 for a specific mass value.

FIG. 2A is a graph representing the LC/MC TIC chromatogram of FIG. 1A after processing with the method according to the present invention.

FIG. 2B is is a graph representing the SIC chromatogram of FIG. 1B after processing with the method according to the present invention.

FIG. 8 is a graph representing a typical medium frequency distribution.

FIG. 9 is a graph representing a typical broad frequency distribution.

FIGS. 10A and 10B are graphs representing another example of SIC chromatograms corresponding to a medium frequency distribution for a mass value of 58 before and after processing respectively.

FIGS. 11A and 11B are graphs representing another example of SIC chromatograms corresponding to a broad frequency distribution for a mass value of 60 before and after processing respectively.

FIGS. 12A and 12B are graphs representing another example of a SIC chromatogram at a mass value of 147 and a corresponding TIC, in which the gain was modified during the coarse of the experiment.

FIGS. 15A and 15B are graphs showing respectively a processed data chromatogram and a match chromatogram obtained from a commercial library of mass spectra.

DETAILED DESCRIPTION OF THE PREFERRED EMBODIMENT

The approach used for the method according to the present invention allows determination and attenuation of a background signal present in a multi-dimensional data set representing a measurement signal, and particularly in bi-dimensional and tri-dimensional intensity/variable systems. This approach also allows the determination of elution peaks, i.e. signal components of interest that appears with time. The resulting data has an increased information content in all reference planes related to the intensity of the signal (intensity-mass, intensity-time). A first objective of the method described hereinafter is to process data in order to remove the useless background signal therefrom, a second objective being to detect substantially all peaks of interest, particularly those having small intensity value. In doing so, the information content is significantly increased which facilitates data interpretation and lowers detection limits of the analytical technique used. The proposed method can be applied to many analytical techniques and can rapidly process analytical data. In these cases, it offers several advantages because it removes background signal, which is mainly due to the presence of interfering substances and instrumental conditions, and spikes from the data, and allows the determination of elution peaks. In techniques such as GC/MS, LC/MS and Py-MS it strips the overall recording from useless signal and enhances the signals of interest which facilitates the detection of elution peaks and the interpretation of the data.

Although the following description refers to applications of the present invention for measurement signals obtained with mass spectrometry (GC/MS, LC/MS) techniques involving a tri-dimensional representation (intensity-time-mass), it is to be understood that methods according to the present invention are not limited to such techniques. It is of general use and can be applied with many measurement techniques where the background signal has to be removed and a peak profile have to be detected.

Figure 3A:
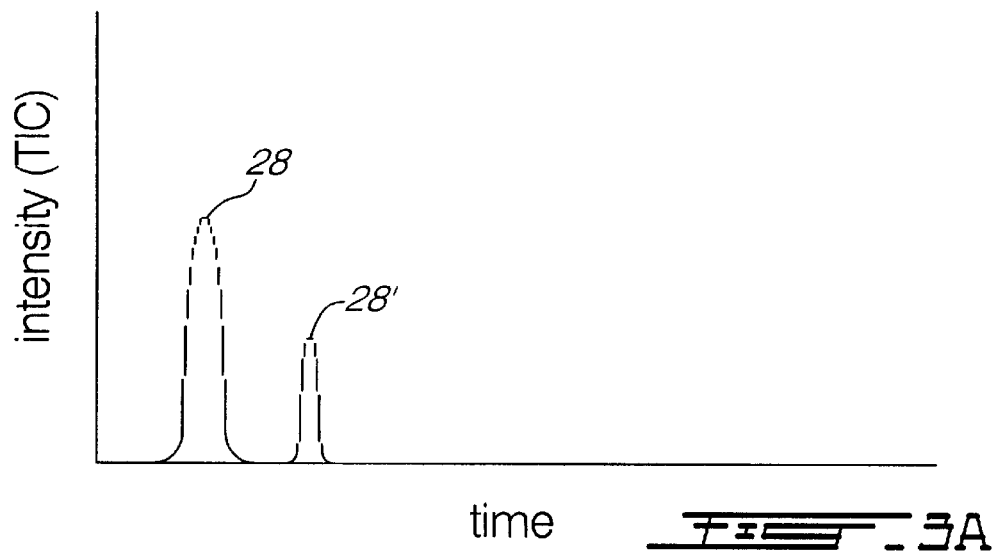
FIG. 3A is a graph representing a TIC chromatogram as a bi-dimensional representation of the intensity data matrix where the mass axis has been contracted.
Figure 3B:
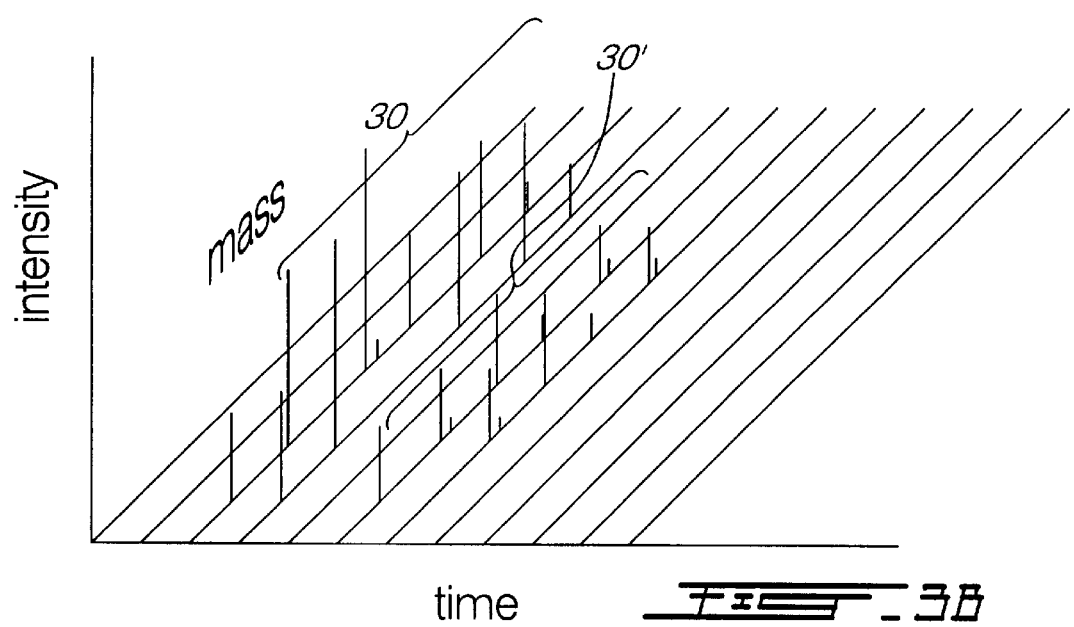
FIG. 3B is a graph representing a tri-dimensional chromatogram from which the graph of FIG. 3A was derived.

The principle of the method will now be explained with reference to examples involving separation techniques (GC, LC) coupled to mass spectrometry (GC/MS, LC/MS). In these techniques, a mixture is introduced into the instrument and compounds are separated in the chromatographic section while as they elute into the mass spectrometer their mass spectra are recorded. The mass spectrometer is continuously scanned according to a repetitive scanning (REP) where it covers a range of mass values, or may alternate between selected mass values such as in selected ion monitoring (SIM) and multiple reaction monitoring (MRM). Thus, mass spectra or specific ion signals are recorded with time. One obtains a tri-dimensional data matrix with intensity, time and mass axis. Generally, the chromatogram is reconstructed in the form of the total ion current (TIC) which is obtained by summing the total ion current in every spectrum. The TIC chromatogram represents a bi-dimensional representation of the data matrix where the mass axis has been contracted as shown in FIG. 3A in view of FIG. 3B. Every peak 28, 28' appearing in the TIC chromatogram shown in FIG. 3A has a corresponding mass spectrum 30, 30' as shown in FIG. 3B, from which compounds can be identified and/or quantified. However, in many cases, the spectrum is heavily contaminated by interfering signals and the elution peak profile of the TIC chromatogram is lost in the background. Hence, the elution profile can not be determined and it is difficult to interpret the spectrum corresponding to the compound because it contains ions signals that correspond to the background rather to the substance of interest, as explained before with reference to FIGS. 1A and 1B. Comparing FIGS. 1A and 1B with FIGS. 2A and 2B respectively, it can be seen that most of the background signal has been removed, resulting in an enhanced signal-to-noise ratio for the elution peaks 20' and 24' shown in FIGS. 2A and 2B respectively. Such useful result can be particularly well appreciated with reference to peak eluted at time 186 and designated at 32 in FIG. 2A, which peak was practically undetectable in the TIC chromatogram raw data of FIG. 1A. It can further be seen that spike 26 shown in FIG. 1B was entirely eliminated by the processing method, allowing identification of main peaks 24'.

Figure 4:
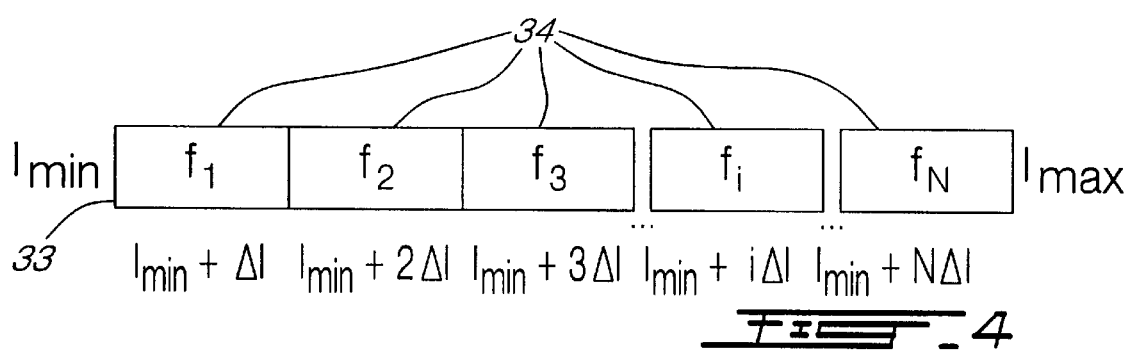
FIG. 4 shows an array representing an intensity histogram vector associated with a frequency distribution of $f_i$ from the intensity values of a processed measurement signal.

The method according to the present invention is based on two main hypotheses. First, the presence of a signal portion due to background noise has a higher occurrence frequency than portions of interest which are due to isolated compounds. In other words, a signal portion due to background noise is observed more often than a portion signal due to a given component present in the sample. Second, during a measurement or analysis, the number of scans (discrete time-steps) in which a single component elutes is much smaller than the total number of scans performed during the measurement or analysis. In order to calculate the intensity distribution of the signal measured for each mass as for the example shown in FIGS. 3A and 3B, or more generally for each data channel as a function of time, data representing intensity values of the measurement and being comprised within a main intensity range are separated in intensity sub-ranges using the following equation:

$$\Delta I = (I_{max} - I_{min})/N \quad (1)$$

wherein $\Delta I$ represents the main intensity range, $I_{min}$ and $I_{max}$ representing a minimum and a maximum intensity value, respectively and N being a selected number of intensity sub-ranges. $I_{min}$ is the minimum intensity recorded for a given mass or data channel with time, while $I_{max}$ is the maximum intensity recorded for a given mass or data channel with time. For the example shown in FIGS. 2A and 2B, N was given a value of 50, as will be explained later in more detail Then, an intensity histogram vector as represented by the array 33 shown In FIG. 4 is formed, which vector representing a frequency distribution of $f_i$ from the intensity values. This intensity histogram vector has N frequency vector components associated with corresponding N intensity sub-ranges extending from $I_{min}$ to $I_{max}$, each sub-range having a width $\Delta I$. Once a vector structure as represented by array 33 has been determined, the intensity of the signal for each mass or data channel is read as a function of time or scan number, i.e. the mass-time plane in FIG. 3B, and depending on the intensity, "1" is added in the appropriate intensity sub-range box 34 of FIG. 4 associated with each vector component For example, if a first scan has an intensity that falls in the $I_{min}+\Delta I$, "1" will be added to the box corresponding to $f_1$. If a following second scan has an intensity that falls in the range of $I_{min}+3\Delta I$ "1" will be added to that box and so on. At the end of the process, i.e. when the intensity of a given mass or data channel for every scan has been placed in the appropriate box for all of the scans, a frequency of occurrence $f_i$ is obtained for each intensity range box. The procedure is repeated for each mass or data channel until all of the data have been processed. Hence, for a given mass or data channel a frequency $f_i$ is obtained representing the frequency of occurrence of the signal in a given intensity range and this for each intensity range from $I_{min}$ to $I_{max}$. Since the intensity frequency of a signal belonging to a true compound is of a random, low frequency intensity and that of the background signal is contained within a range of high frequency intensities, the intensity range with the maximum frequency is considered as noise and should be removed.

Figure 5:
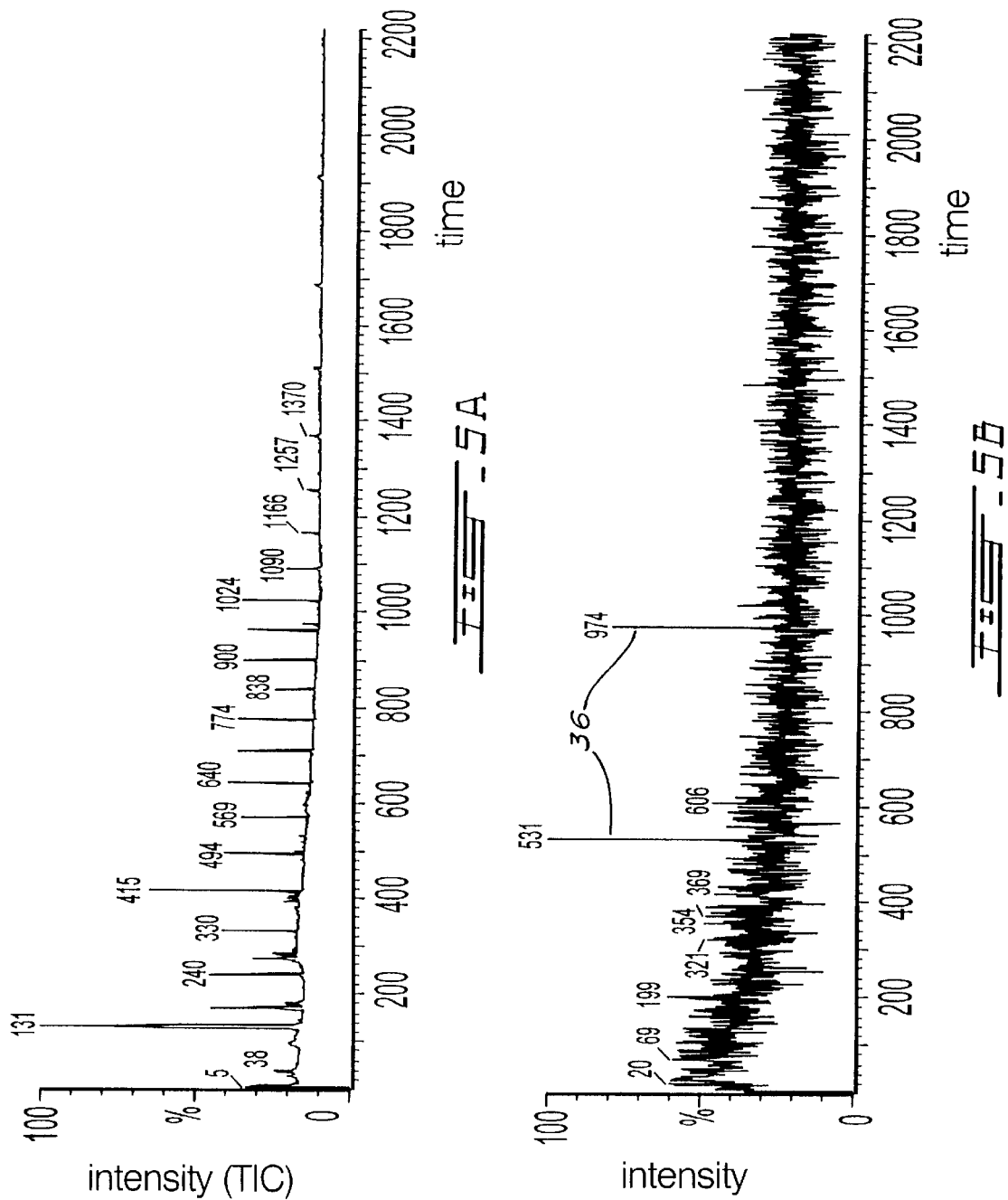
FIGS. 5A and 5B show a TIC chromatogram and a SIC chromatogram of mass 50 respectively, which were obtained from another experimental analysis.
Figure 6:
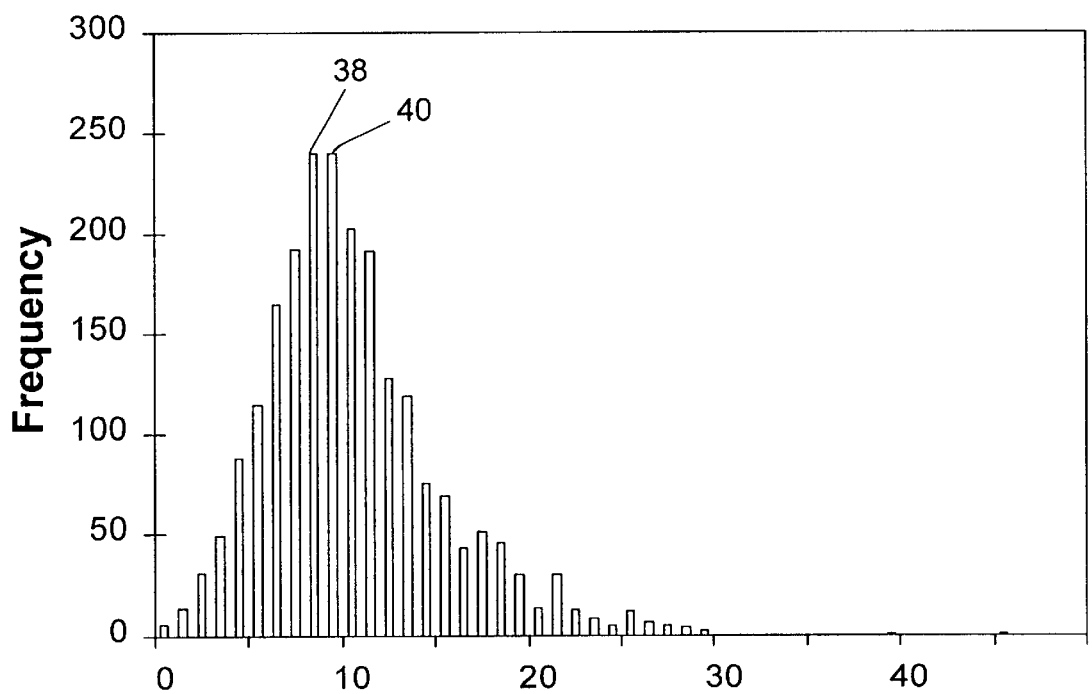
FIG. 6 is a graph representing a frequency distribution from the measured intensity values corresponding to the chromatogram of FIG. 5B.

Referring now to FIGS. 5A and 5B, there are shown a TIC chromatogram and a SIC chromatogram of mass 50 respectively, which chromatograms were obtained from another experimental analysis. It can be seen that in the TIC chromatogram of FIG. 5A, true peaks are difficult to observed while true peaks 36 are well defined in the SIC chromatogram of FIG. 5B. However, a residual signal can be seen in the SIC chromatogram, its intensity being contained within a narrow, high frequency intensity range. After assigning the intensity of mass 50 in each scan to one of the boxes 34 in the intensity range array of FIG. 4, an intensity histogram vector representing a frequency distribution from the measured intensity values can be obtained for that mass or data channel, as shown in FIG. 6. It can be seen from FIG. 6 that a maximum frequency of occurrence, having a value of 240, is observed for the 8$^{th}$ and 9$^{th}$ intensity ranges, as designated at numerals 38 and 40, indicating that the background signal is within these intensity ranges. Thus, intensity values below or equal to the corresponding threshold intensity value for these ranges should be rejected because they are below the noise level, while this value should be subtracted of those values above to correct them from the background signal.

The actual threshold intensity $I_c$ that should be considered as noise, and that must be subtracted accordingly, depends on the measurement technique used and on the distribution of intensities. The precise determination of this value is essential because if it is underestimated the background signal will remain after treatment, and if it is overestimated signals of interest may be removed from the data set which would lead to erroneous results. The method, in order to evaluate the background signal as precisely as possible, preferably uses the shape of the intensity frequency distribution. Intensity distributions will vary depending on the measurement technique used, on the amount of background signal, on experimental conditions etc. Because many factors can influence me shape of the intensity frequency distribution the method will determine the threshold signal to be subtracted as a function of the shape of the intensity frequency distribution. Depending on the analysis performed, it will preferably classify each intensity frequency distribution into one of two or three distinct categories, namely narrow, medium and broad category, and the background signal to be subtracted will depend on the type of distribution. Several criteria are used in order to determine in which category the intensity distribution is assigned. Prior to this assignment and to respect statistical requirements, the value chosen for N, the selected number of intensity sub-ranges found in equation (1) above, must be appropriate. An improper choice of value for N, and by way of consequence of the width ΔI of the intensity ranges, would skew the intensity distribution and render the statistics less reliable. Hence, the value of N will be preferably chosen according to the following rules:

*N* equals to about 50 if $I_{max}/I_{min} \leq 10,000$; *N* equals to about 1,000 if $10,000 < I_{max}/I_{min} \leq 100,000$;

and

*N* equals to about 10,000 if $100,000 < I_{max}/I_{min}$.   (2)

Once the value of N has been determined, it is possible to assign a frequency $f_i$ to each of the N intensity boxes 34 (i=1 to N) and the intensity value $I_i$ associated to each box can be determined using the following equation:

$$I_i = I_{min} + i\Delta I \quad (3)$$

The intensity distributions obtained for each mass or data channel after the choice of the appropriate N are then analyzed for the determination of the type of distribution. However, before conducting this analysis, a test is preferably done to determine and attenuate rare mass or channel signals. In this test, the ratio of the sum of the frequencies at each mass or data channel j over the total number of scans or point recorded (TSN) is calculated, and the following test is applied:

$$\sum_{\substack{i=1,N \\ j=1,K}} f_{ij} \Big/ \sum_{i=1,N} f_{ij} \leq T_r \quad (4)$$

wherein $T_r$ is a rarity threshold value. For example, assuming a value $T_r$=0.1. If equation (4) is satisfied, then an intensity value $I_p$=0.05$I_{max}$ is subtracted from the data channel. This ensures that statistics on a small number of sample does not bias the results.

Figure 7:
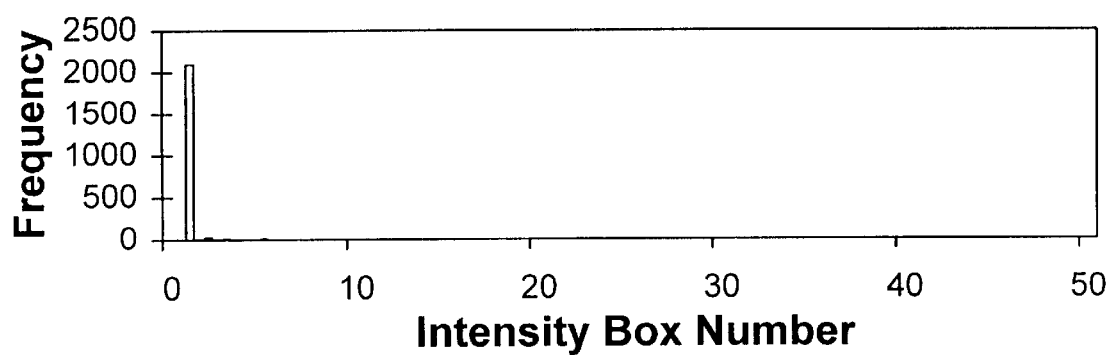
FIG. 7 is a graph representing a typical narrow frequency distribution.

The following steps regard the classification of intensity frequency distributions. For each distribution corresponding to a given mass of data channel j, a main intensity range extends from a minimum intensity value $I_{minj}$ to a maximum intensity value $I_{maxj}$. Each distribution can be classified in one of at least a first and a second category of shape characteristics defined by:

$$T_s < f(I_{maxj}) \Big/ \sum_{i=1,N} f_{ij} \quad \text{for the first category; and} \quad (5)$$

$$f(I_{maxj}) \Big/ \sum_{i=1,N} f_{ij} \leq T_s \quad \text{for the second category;}$$

wherein $T_s$ is a shape threshold value being selected to allow each distribution to be classified in the first category whenever it exhibits a substantially narrow shape, $f(I_{maxj})$ being a frequency value associated with the maximum intensity value $I_{mazj}$, while $f_{ij}$ represents a value for each frequency vector component of index i associated with each vector $F_j$. Typically, a distribution is considered as being classified in the first, narrow category whenever the first condition above is met with $T_s$=90%. For example, if the maximum frequency in the intensity range of a given distribution has a value $I_{maxj}$=300 and the sum of all frequencies in the distribution has a value $$\sum_{i=1,N} f_{ij} = 325,$$

which represents 92.3%, the distribution will be considered as narrow. FIG. 7 shows an example of such narrow distribution. In the case of a narrow distribution that is assumed to be normal (Gaussian), the value of the threshold intensity $I_{cj}$ to be subtracted will be preferably determined from the value of the standard deviation $\sigma_j$ of the distribution j. The intensity threshold value $I_{cj}$ for the first, narrow category is defined by:

$$I_{cj} = I_{maxj} + 1; \text{ whenever } \sigma_j < T_d;$$

and $$I_{cj} = I(f_{maxj}); \text{ whenever } \sigma_j \geq T_d; \quad (6)$$

wherein $I(f_{maxj})$ is an intensity value associated with a maximum frequency value $f_{maxj}$ of each vector $F_j$, $T_d$ being a threshold value associated with the standard deviation $\sigma_j$ of the distribution. Typically, a threshold value $T_d$ of about 0.9% is used. Alternatively, whenever a distribution satisfies the second condition set forth at (5) above, it can be considered as belonging to the second category representing medium and broad distributions. Conveniently, a second shape threshold value $T_s'$ can be defined to segregate between medium and broad frequency distributions, in which case, we have:

$$T'_s \leq \frac{f(I_{\max j})}{\sum_{i=1,N} f_{ij}} \leq T_s \text{ for a medium frequency distribution, and} \quad (7)$$

$$\frac{f(I_{\max j})}{\sum_{i=1,N} f_{ij}} \leq T_s \text{ for a broad frequency distribution}$$

Typically, a second shape threshold value $T_s'$ of about 30% used. Example of medium and broad frequency distributions are depicted in FIGS. 8 and 9 respectively. For medium and broad frequency distributions, the intensity threshold value $I_{cj}$ to be subtracted is calculated in the following way:

$$I_{cj} = I_{contj} P \quad (8)$$

$$I_{conj} = \frac{\sum_{i=\text{imax}j-w}^{\text{imax}j+w} f_{ij} I_{ij}}{\sum_{i=\text{imax}j-w}^{\text{imax}j+w} f_{ij}} \quad (9)$$

wherein $I_{ccntj}$ is a centroid intensity value for the distribution;

P is a weighing factor depending from the shape characteristics and the measurement signal, the latter depending from the specific measurement technique used;

imaxj is an index value corresponding to the maximum frequency value $f_{maxj}$;

w is a discrete width parameter value, and $I_{ij}$ represents one of the intensity values corresponding to the frequency vector component of index i of each vector $F_j$. Typically, the width parameter is given a value of w=3, so that the seven highest frequencies in the distribution are determined and the centroid intensity value is calculated using equation (9) which value is used to obtain the intensity threshold value $I_{cj}$ from equation (8). The method includes a step of zeroing each portion of the data corresponding to the intensity values which are below the intensity threshold value $I_{cj}$. Then, the intensity threshold value $I_{cj}$ is subtracted from each remaining portion of the data corresponding to the remaining intensity values, to obtain processed data representing the measurement signal wherein each peak exhibits an enhanced signal-to-noise ratio. Examples of SIC chromatograms corresponding to medium and broad frequency distributions for mass values of 58 and 60 respectively are shown in FIGS. 10 and 11, before (FIGS. 10A and 11A) and after (FIGS. 10B and 11B) processing with the method. It can be observed from FIG. 11 that there is a fluctuation in the background noise level that leads to a broad distribution.

Figure 13:
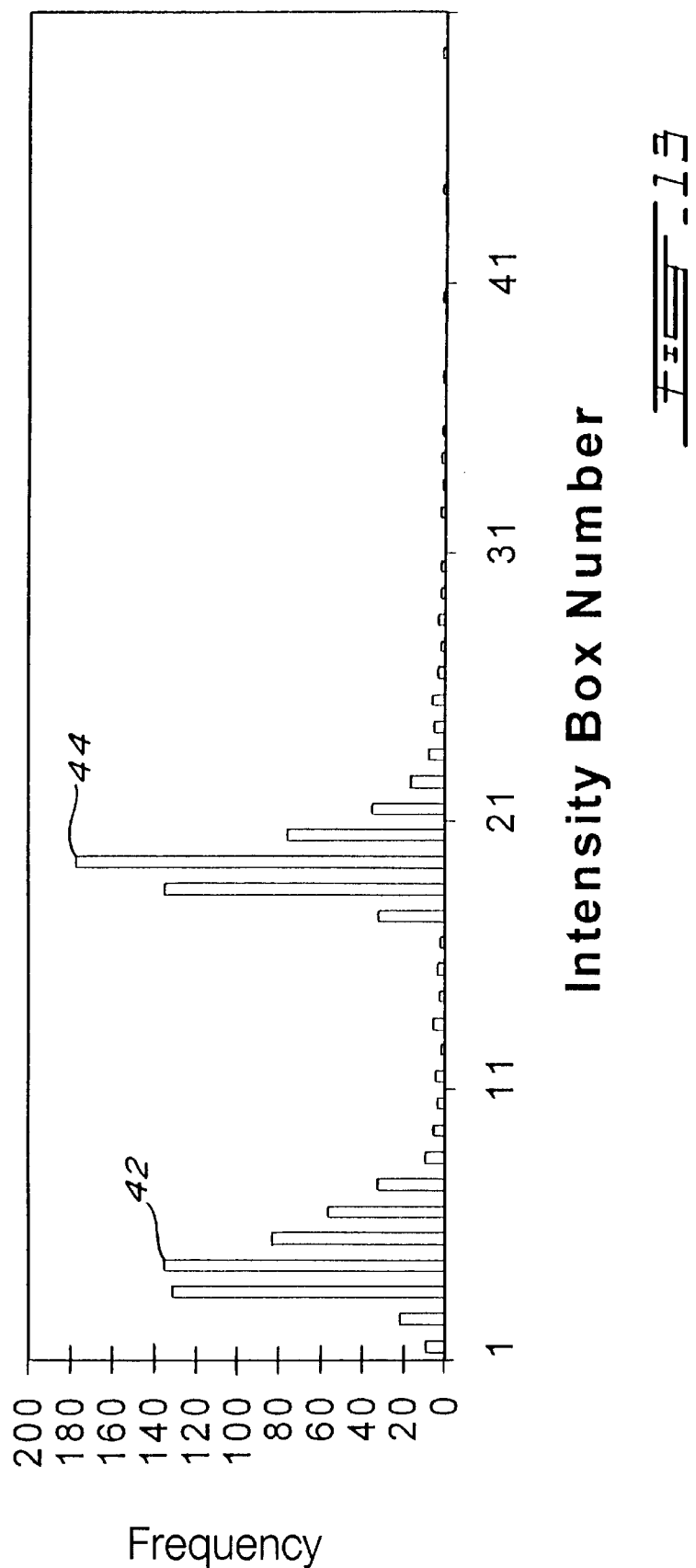
FIG. 13 represents the intensity frequency distribution obtained for the data from which FIG. 12A was derived.

Beside the above examples where the background noise is substantially regular, there are instances where the experimental conditions may vary during the coarse of an analysis, thus modifying the intensities measured. In such cases, an abrupt variation in background intensity (increase or decrease) can be observed which modifies the statistical parameters. An example of an analysis in which the gain was modified during the coarse of the experiment is shown in FIGS. 12A and 12B respectively representing a SIC chromatogram at a mass value of 147 and a corresponding TIC. In such a case, the statistics are modified and the intensity frequency distribution can give a function with more than one maximum, as shown in FIG. 13, which represents the intensity frequency distribution obtained for the data from which FIG. 12A was derived. The distribution shows two maxima 42 and 44 which result from the change in experimental conditions during analysis. The data represented in FIG. 13 is typical of a distribution obtained in a set of statistically unrelated data. In such a case, the algorithm is made to process the two portions of the data set characterized by their respective substantially regular background noise in separate fashions. Thus, in the example above, the data set would be treated as described previously from time scans 1–525 and from time scans 526–1020. The same principles as described before apply.

Figures 14A, 14B:
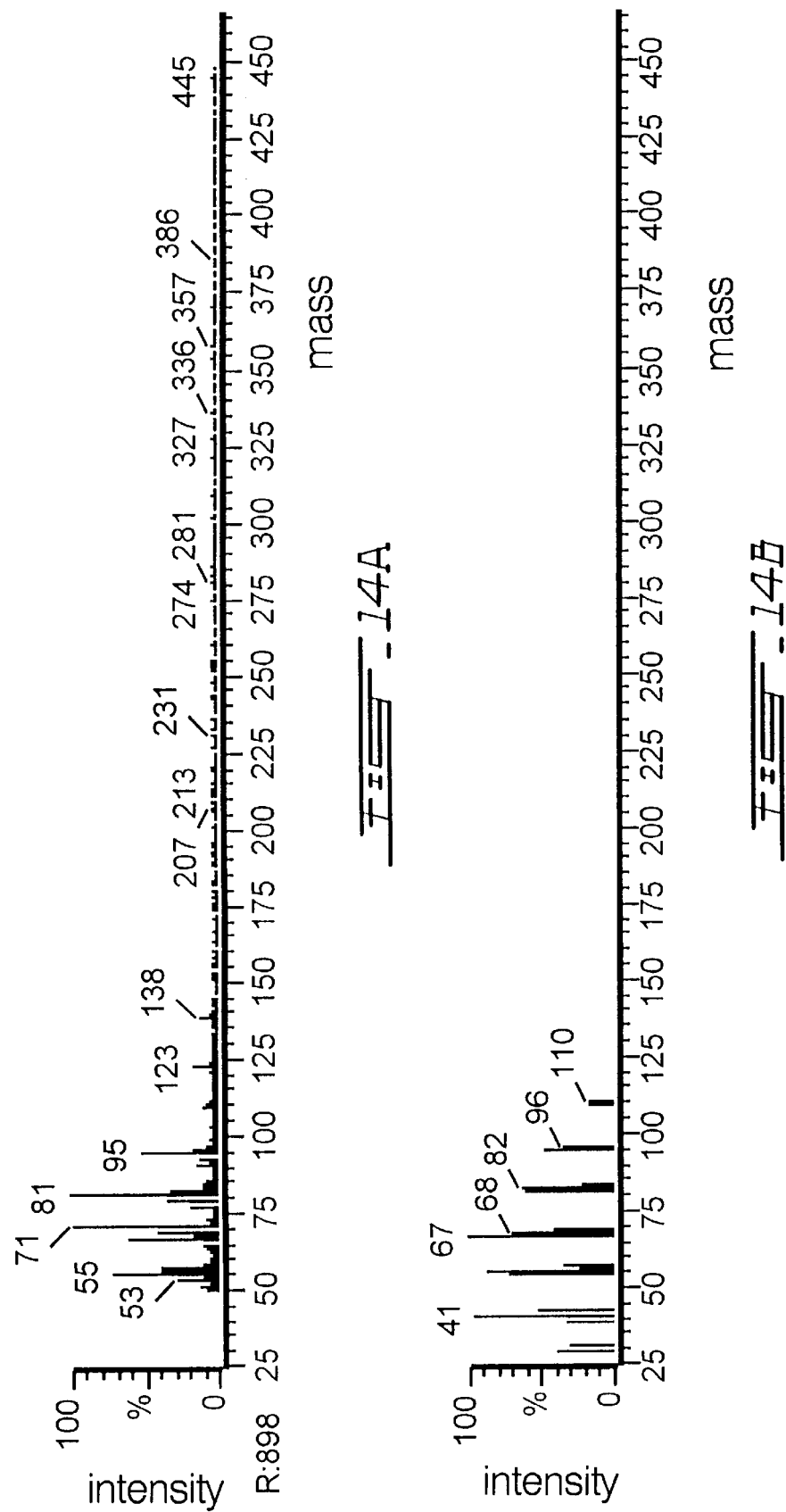
FIGS. 14A and 14B are graphs showing respectively a raw data chromatogram and a match chromatogram obtained from a commercial library of mass spectra.

Referring now to FIGS. 14A and 14B, it is shown a match obtained when searching the raw data (FIG. 14A) against a commercial library of mass spectra. It is obvious that although a match is found (FIG. 14B) which corresponds to a 5-dodecinol, it is of poor reliability by comparison of the mass spectrum used with that provided by the library. However, as shown in FIGS. 15A and 15B, when processed data (FIG. 15A) is matched against the library, a resulting match (FIG. 15B) corresponding to L-(−)-menthol is obtained. It can readily be seen that there is a striking similarity between the spectrum from the library and that obtained by treatment of the data, rendering the match highly reliable. Thus, the method described using adjustable parameters that depend on the measurement technique used, can practically eliminate the unwanted signal while preserving the essential information and increase the information content and detection limits of a given analytical method. It modifies the total ion current and the mass spectra enhancing the information content at each level (TIC and mass spectrum).

Another feature of the present invention resides in the capability of determining elution profile once the background signal has been removed. This feature allows eluting peaks to be detected and their "purified" mass spectrum to be obtained. The data matrix after it has been processed to attenuate unwanted background signal yields a new data matrix (intensity-mass-time). This matrix resembles the initial one but the intensity axis has been modified. The purpose of the further processing to determine elution peaks in the TIC that may not have been distinguishable in the raw data. The initial step in the procedure is to eliminate spikes peaks that may be present in the treated data. A spike is a transient signal whose lifetime is much shorter than that of a genuine signal. Thus, the method further comprises the step of zeroing portion of the data which is associated with a spike in the measurement signal, the spike data being characterized by one or more substantially non-zero values separated by adjacent substantially zero values over a corresponding maximum length $l_s$ of the discrete variable, to remove the spike from the measurement signal. For example, a spike may be present for one or two scans (time samples) whereas a genuine signal will be persistent for 3–5 scans. In order to identify and remove these spikes, the algorithm analyzes each mass or data channel looking for a "010" or "0110" pattern in the data. In the preceding pattern, "0" and "1" represent the absence and presence of a signal intensity in the mass-time plane. Whenever the pattern is found, the algorithm removes the spike and set the signal to zero. After this is done, a new spike free data matrix is generated in which only intensities have been modified. This new matrix will then be used to determine elution peak profiles. Before determining the elution peaks, the data matrix is further processed by substituting a unitary value for each remaining substantially non-zero value of the intensity values to form with remaining zero values M binary intensity vectors $B_j$ each having K vector components $b_{jk}$.

Figure 16:
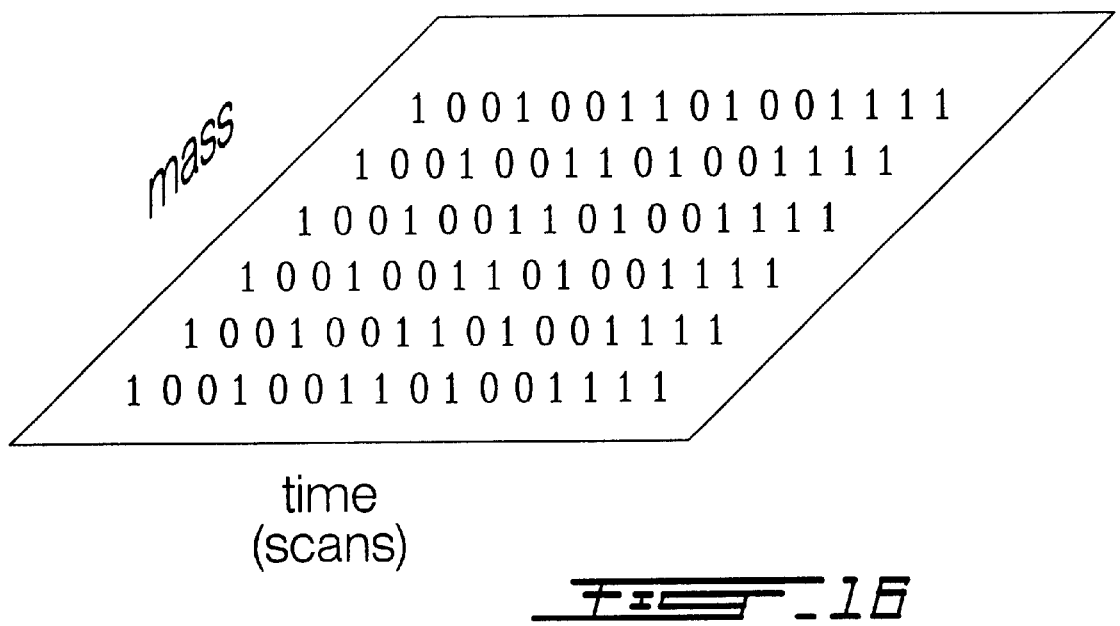
FIG. 16 is a representation of a processed data matrix obtained as part of the spike elimination function of the method.

Thus, the resulting data set as shown in FIG. 16 has the form of a plane (mass-time) in which the values are either "0" or "1". The data set indicates whether a mass is present or absent (signal or no signal) in each of the scans. After having obtained the latter matrix, a cumulative vector is formed which has K vector components $c_k$ associated with corresponding K values for the first discrete variable (time) from the binary intensity vectors $B_j$, the value for each cumulative vector component being defined by:

$$c_k = \sum_{j=1}^{M} b_{jk}, \quad \text{with } k = 1, \ldots, K \tag{10}$$

Figure 17:
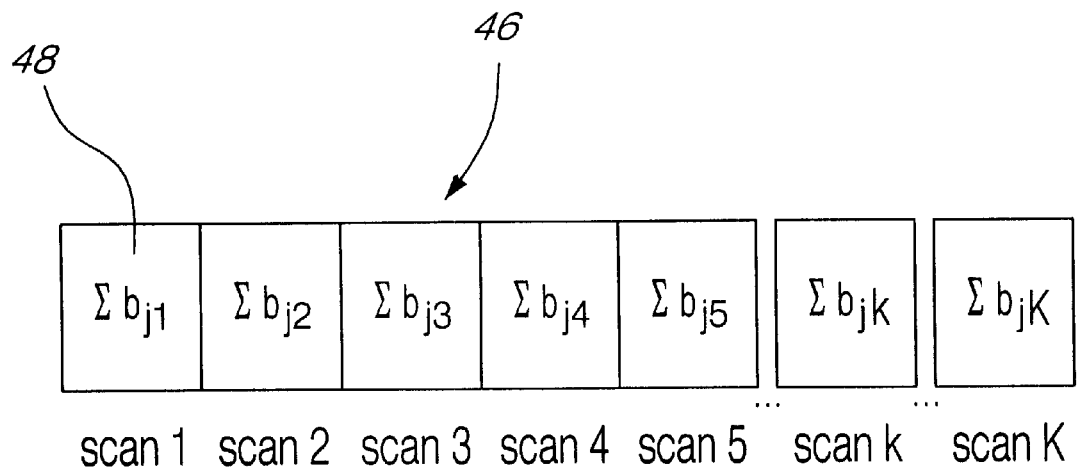
FIG. 17 shows an array representing a cumulative intensity histogram vector obtained from processed data such as represented at FIG. 16 as part of the peak detection function of the method.

The cumulative vector obtained is represented by the array 46 shown in FIG. 17. For each scan or sample, a sum of the occurrences is calculated for every mass in the mass range. For example, for scan no. 1 the algorithm will sum all the "1" present from the initial mass ($m_1$) to the final mass ($m_M$) and will place the value obtained $c_l$ in the first box 48 of the array 46. The same process is done for scan no. 2 leading to the value $c_2$ and so on up to $c_K$. Because the actual intensities have been replaced by "1", $c_1$ represents the number of masses present in scan 1, $c_2$ the number of masses present in scan 2 and so on. Thus, the array represents the frequency of the number of masses present as a function of scan number or time. If a component elutes from the chromatographic system during a given period of time, the number of masses present in the corresponding scan range will increase. Hence, the persistence of a high number of masses can be taken as an indication of an elution peak and the array 46 can be used to detect that elution peak (true signal).

| $\sum m_{i_1}$ | $\sum m_{i_2}$ | $\sum m_{i_3}$ | $\sum m_{i_4}$ | $\sum m_{i_5}$ | $\sum m_{i_6}$ | $\sum m_{i_n}$ |
|---|---|---|---|---|---|---|
| scan 1 | scan 2 | scan 3 | scan 4 | ... | ... | scan $n$ |

Several instrumental factors can cause transient signals to be present in one or two scans. For example, a pressure variation during an LC/MS analysis can cause the background signal to rise temporarily causing an increase in the number of peaks recorded in one or two scans. In order to eliminate such transient signals, the algorithm conducts a second spike eliminating procedure. In a way similar to the one described previously for the data matrix, the cumulative vector represented by array 46 of FIG. 17 is transformed in the following way. Each vector component value $c_k$ which is associated with a cumulative spike is given a zero value, cumulative spike data being characterized by one or more substantially non-zero values for the cumulative vector components separated by adjacent substantially zero values over a corresponding maximum length $l_{cs}$ of the first discrete variable (time). Hence, a filtered cumulative vector having K vector components $c_k'$ is generated from remaining substantially non-zero values for the cumulative vector components $c_k$. Referring to FIG. 17 as an example, for each scan box 48, the value of $\Sigma b_{jk}$ is read and it is replaced by 1 if it is a non-zero value, thus. yielding an array containing only a plurality of "0" and "1". After the conversion, a search for a "010" or "0010" pattern is conducted. When either pattern is found, they are replaced by "0" to eliminate spikes. This procedure does not affect the signals due to eluting components because their signal, in most cases, will be persistent for about 5 to about 10 scans. Obviously, this condition varies depending on the measurement technique used. Conveniently, an input parameter $W_s$ is used to calibrate the procedure. $W_s$ represents the minimum number of scans during which the signal is expected to persist in a given technique. For example, in gas chromatography the value of $W_s$ would be about 4 to 5. Hence, a spike pattern is generally considered to have a value lower than $W_s/2$. Once the spikes have been removed, the array is reconstructed with the real values of the intensities. More specifically, the method comprises a step of comparing successive vector components of the filtered vector components $c_k'$ for k=1..., K to detect a value increase from one of the vector component to a group of $P_w$ vector components corresponding to the peak whenever:

$$W_s < P_w < W_m; \tag{11}$$

wherein $W_s$ and $W_m$ are minimum and maximum peak width values respectively. Referring again to FIG. 17, the array 46 is then used to detect the elution peaks present the TIC. This is done by examining the intensity value in each of the boxes 48 of the array 16 and by looking at an increase of the signal from one box to the other. Since the spikes ("0x0" or "0x0" patterns, where x and y represent non-zero values) have already been removed by the preceding operation, any increase in the intensity from one box to the other (slope increase) is indicative of an elution peak. When a peak is detected, the algorithm sets a start scan and defines the end scan when it finds a box with zero intensity. The maximum peak width $W_m$ is defined as an input in order to set this parameter appropriately because it depends on the analytical technique used. Thus, the peak has to respect the slope condition and its width will be given by equation (11). The process is conducted for all the boxes 48 and at the end the position of the elution peaks have been detected. Then, the algorithm proceeds with the determination of the peak profiles. For every peak contained in the interval of equation (11), the corresponding portion of the array is copied. For each scan within the elution profile, the number of masses present is calculated and the values obtained are ranked in increasing order. The median (M) is calculated for all the values in the portion of the array and the intensity of ions in scans having a number of ions being lower than M/2 is set to zero. For mass spectrometric data obtained in the scanning mode the latter procedure is used. However, when the data have been obtained in selected ion/reaction monitoring (SIM. SIR, MRM), the final procedure is skipped because of the reduced number of masses involved.

At the end of the procedure, a data matrix is obtained (intensity-mass-time) in which the intensity values have been processed but the mass and time axes are the same as in the raw data. The corresponding TIC can be used to reconstruct the chromatogram which yields scan regions containing peak intensities (signal of interest) as those shown in FIGS. 2A and 2B, while the regions between peaks of the TIC are given a zero value. This facilitates peak detection and integration in the TIC but also data interpretation. Actually, the mass spectra corresponding to each elution peak only include the masses with non-zero intensity that remain after the background signal has been stripped. Thus, these spectra have an increased information content. It can be seen from FIGS. 1A and 2A that the processed spectrum (FIG. 2A) and the raw spectrum (FIG. 1A) are quite different. Similarly, it can be seen from FIGS. 14 and 15 that the processed spectrum (FIG. 15B) can easily be compared to that of a reference spectrum (FIG. 15A), while the raw spectrum (FIG. 14B), contaminated by background signal, does not correspond to that of the reference spectrum (FIG. 14A) and easily leads to misinterpretation.

What is claimed is:

1. A method of processing data representing intensity values of an experimental measurement signal as a function of a discrete variable, said signal being characterized by at least one peak mixed with a substantially regular background noise, said intensity values being comprised within a main intensity range, the method comprising the steps of:

i) forming an intensity histogram vector representing a frequency distribution from said intensity values, said intensity histogram vector having N frequency vector components associated with corresponding N intensity sub-ranges;

ii) zeroing a noisy portion of said data corresponding to the intensity values which are below an intensity threshold value defined according to shape width characteristics of said distribution; and iii) subtracting said intensity threshold value from each remaining portion of said data to obtain processed data representing the measurement signal with said peak exhibiting an enhanced signal-to-noise ratio.

2. The method according to claim 1, wherein said main intensity range extends from a minimum intensity value $I_{min}$ to a maximum intensity value $I_{max}$, said distribution being classified in one of at least a first and a second category of shape width characteristics defined by:

$$T_s < \frac{f(I_{max})}{\sum_{i=1,N} f_i} \text{ for the first category; and}$$

$$\frac{f(I_{max})}{\sum_{i=1,N} f_i} \leq T_s \text{ for the second category;}$$

wherein $T_s$ is a first shape threshold value being selected to allow said distribution to be classified in the first category whenever it exhibits a narrow shape, $f(I_{max})$ being a frequency value associated with the maximum intensity value $I_{max}$, $f_i$ representing a value for each said frequency vector component of index i.

3. The method according to claim 2, wherein said intensity threshold value for said first category is defined by:

$$I_c = I(f_{max});$$

wherein $I(f_{max})$ is an intensity value associated with a maximum frequency value $f_{max}$.

4. The method according to claim 2 or 3, wherein said intensity value for said second category is defined by:

$$I_c = I_{cent} P$$

wherein $I_{cent}$ is a centroid intensity value for said distribution, P being a weighing factor depending from said shape width characteristics and said measurement signal.

5. The method according to claim 4, wherein said centroid intensity value is defined by:

$$I_{cent} = \sum_{i=imax-w}^{imax+w} f_i I_i \Big/ \sum_{i=imax-w}^{imax+w} f_i$$

wherein imaxj is an index value corresponding to said maximum frequency value $f_{max}$, w is a discrete width parameter value, $I_i$ representing one of said intensity values corresponding to the frequency vector component of index i.

6. The method according to claim 1, further comprising after said step iii) the step of:

iv) further processing said processed data to detect said peak.

7. The method according to claim 6, wherein said step iv) comprises the steps of:

a) zeroing portion of said data which is associated with a spike in said measurement signal, said spike data being characterized by one or more substantially non-zero values separated by adjacent substantially zero values over a corresponding maximum length $l_s$ of said discrete variable, to remove said spike from the measurement signal.

8. A method of processing data representing intensity values of a measurement signal as a function of a first and a second discrete variable, said signal being characterized by at least one peak mixed with a substantially regular background noise, the intensity values as a function of said first discrete variable and associated with each one of M successive values for said second discrete variable being comprised within a corresponding said main intensity range, the method comprising the steps of:

i) forming M intensity histogram vectors $F_j$ representing frequency distributions from the intensity values associated with the M successive values of said second discrete variable, each said intensity histogram vector having $N_j$ frequency vector components associated with corresponding $N_j$ intensity sub-ranges, with j=1, . . . , M;

ii) zeroing a noisy portion of said data corresponding to the intensity values associated with each said distribution which are below an intensity threshold value $I_{cj}$ value defined according to shape width characteristics of Said distribution; and iii) subtracting said intensity threshold value from each remaining portion of said data corresponding to said intensity values associated with each said distribution, to obtain processed data representing the measurement signal with said peak exhibiting an enhanced signal-to-noise ratio.

9. The method according to claim 8, wherein said measurement signal is obtained from a separation technique-mass spectrometry measurement method, said first discrete variable is a discrete time variable, said second discrete variable is a discrete mass-related variable.

10. The method according to claim 9, wherein said separation technique is selected from the group consisting of gas chromatography, liquid chromatography and pyrolysis.

11. The method according to claim 8, wherein each said main intensity range extends from a minimum intensity value $I_{minj}$ to a maximum intensity value $I_{maxj}$, each said distribution being classified in one of at least a first and a second category of shape width characteristics defined by:

$$T_s < \frac{f(I_{maxj})}{\sum_{i=1,N} f_{ij}} \text{ for the first category; and}$$

$$\frac{f(I_{maxj})}{\sum_{i=1,N} f_{ij}} \leq T_s \text{ for the second category;}$$

12. The method according to claim 11, wherein said intensity threshold value for said first category is defined by:

$$I_{cj} = I_{maxj} + 1; \text{ whenever } \sigma_j < T_d;$$

and $$I_{cj} = I(f_{maxj}); \text{ whenever } \sigma_j \geq T_d;$$

wherein $I(f_{maxj})$ is an intensity value associated with a maximum frequency value $f_{maxj}$ of each said vector $F_j$, $T_d$ being a threshold value associated with a standard deviation $\sigma_j$ for each said distribution.

13. The method according to claim 11 or 12, wherein said intensity threshold value for said second category is defined by:

$$I_{cj}=I_{centj}P$$

wherein $I_{centj}$ is a centroid intensity value for each said distribution, P being a weighing factor depending from said shape width characteristics and said measurement signal.

14. The method according to claim 13, wherein said centroid intensity value is defined by:

$$I_{centj} = \sum_{i=imaxj-w}^{imaxj+w} f_{ij}I_{ij} \bigg/ \sum_{i=imaxj-w}^{imaxj+w} f_{ij}.$$

wherein imaxj is an index value corresponding to said maximum frequency value $f_{maxj}$, w is a discrete width parameter value, $I_{ij}$ representing one of said intensity values corresponding to the frequency vector component of index i of each said vector $F_j$.

15. The method according to claim 11, wherein the intensity values associated with said histogram vector $F_j$ are attenuated prior to classifying the corresponding distribution, whenever:

$$\sum_{i=1,N} f_{ij} \bigg/ \sum_{\substack{i=1,N \\ j=1,K}} f_{ij} \leq T_r$$

wherein $T_r$ is a rarity threshold value.

16. The method according to claim 8, further comprising after said step iii) the step of:
 iv) further processing said processed data to detect said peak.

17. The method according to claim 16, wherein said step iv) comprises the step of:
 a) zeroing a portion of said data which is associated with a spike in said measurement signal, said spike data being characterized by one or more substantially non-zero values separated by adjacent substantially zero values over a corresponding maximum length $l_s$ of said first discrete variable, to remove said spike from the measurement signal.

18. The method according to claim 17, wherein said step iv) further comprises the steps of:
 b) substituting a unitary value for each remaining substantially non-zero values of said intensity values to form with remaining zero values of said intensity values M binary intensity vectors $B_j$ each having K vector components $b_{jk}$;
 c) forming a cumulative vector having K vector components $c_k$ associated with corresponding K values for said first discrete variable from said binary intensity vectors $B_j$, a value for each said cumulative vector component being defined by:

$$c_k = \sum_{j=1}^{M} b_{jk}, \text{ with } k = 1, \ldots, K;$$

d) zeroing said vector component value $c_k$ which is associated with a cumulative spike, said cumulative spike data being characterized by one or more substantially non-zero values for said cumulative vector components separated by adjacent substantially zero values over a corresponding maximum length $l_{cs}$ of said first discrete variable, to generate a filtered cumulative vector having K vector components $c_k$ from remaining substantially non-zero values for said cumulative vector components $c_k$;
 e) comparing successive vector components of said filtered vector components $c_k$ for k=1, ..., K to detect a value increase from one of said vector component to a group of $P_w$ said vector components corresponding to said peak whenever:

$$W_s < P_w < W_m;$$

wherein $W_s$ and $W_m$ are minimum and maximum peak width values respectively.

19. The method according to claim 18, wherein said measurement signal is characterized by a plurality of said peaks to which corresponds a plurality of said groups of $P_w$ vector components, said $P_w$ vector components of each said group are added to generate a ranking index associated to each said peak.

20. A program recording medium readable by a computer, storing program code causing the computer to perform the steps of a method of processing data representing intensity values of an experimental measurement signal as a function of a discrete variable, said signal being characterized by at least one peak mixed with a substantially regular background noise, said intensity values being comprised within a main intensity range, the method comprising the steps of:
 i) forming an intensity histogram vector representing a frequency distribution from said intensity values, said intensity histogram vector having N frequency vector components associated with corresponding N intensity sub-ranges;
 ii) zeroing a noisy portion of said data corresponding to the intensity values which are below an intensity threshold value defined according to shape width characteristics of said distribution; and
 iii) subtracting said intensity threshold value from each remaining portion of said data to obtain processed data representing the measurement signal with said peak exhibiting an enhanced signal-to-noise ratio.

21. The program recording medium according to claim 20, wherein said main intensity range extends from a minimum intensity value $I_{min}$ to a maximum intensity value $I_{max}$, said distribution being classified in one of at least a first and a second category of shape width characteristics defined by:

$$T_s < \frac{f(I_{max})}{\sum_{i=1,N} f_i} \text{ for the first category; and}$$

$$\frac{f(I_{max})}{\sum_{i=1,N} f_i} \leq T_s \text{ for the second category;}$$

wherein $T_s$ is a first shape threshold value being selected to allow said distribution to be classified in the first category whenever it exhibits a narrow shape, $f(I_{max})$ being a frequency value associated with the maximum intensity value $I_{max}$, $f_i$ representing a value for each said frequency vector component of index i.

22. A program recording medium readable by a computer, storing program code causing the computer to perform the steps of a method of processing data representing intensity values of a measurement signal as a function of a first and a second discrete variable, said signal being characterized by at least one peak mixed with a substantially regular background noise, the intensity values as a function of said first discrete variable and associated with each one of M successive values for said second discrete variable being comprised within a corresponding said main intensity range, the method comprising the steps of:

i) forming M intensity histogram vectors $F_j$ representing frequency distributions from the intensity values associated with the M successive values of said second discrete variable, each said intensity histogram vector having $N_j$ frequency vector components associated with corresponding $N_j$ intensity sub-ranges, with j=1, . . . , M;

ii) zeroing a noisy portion of said data corresponding to the intensity values associated with each said distribution which are below an intensity threshold value $I_{cj}$ value defined according to shape width characteristics of said distribution; and iii) subtracting said intensity threshold value from each remaining portion of said data corresponding to said intensity values associated with each said distribution, to obtain processed data representing the measurement signal with said peak exhibiting an enhanced signal-to-noise ratio.

23. The program recording medium according to claim 22, wherein each said main intensity range extends from a minimum intensity value $I_{minj}$ to a maximum intensity value $I_{maxj}$, each said distribution being classified in one of at least a first and a second category of shape width characteristics defined by:

$$T_s < \frac{f(I_{maxj})}{\sum_{i=1,N} f_{ij}} \text{ for the first category; and}$$

$$\frac{f(I_{maxj})}{\sum_{i=1,N} f_{ij}} \leq T_s \text{ for the second category;}$$

wherein $T_s$ is a shape threshold value being selected to allow each said distribution to be classified in the first category whenever it exhibits narrow shape, $f(I_{maxj})$ being a frequency value associated with the maximum intensity value $I_{maxj}$, $f_{ij}$ representing a value for each said frequency vector component of index i associated with each said vector $F_j$.

* * * * *